United States Patent [19]

Brandin

[11] Patent Number: 4,915,618

[45] Date of Patent: Apr. 10, 1990

[54] IGNITER FOR THERMAL LANCE

[75] Inventor: Roland Brandin, Nora, Sweden

[73] Assignee: Norabel AB, Sweden

[21] Appl. No.: 325,541

[22] Filed: Mar. 20, 1989

[30] Foreign Application Priority Data

Mar. 22, 1988 [DE] Fed. Rep. of Germany ....... 3809636

[51] Int. Cl.$^4$ .............................................. F23Q 1/00
[52] U.S. Cl. .................... 431/267; 431/269; 110/349; 266/48; 266/225; 102/205
[58] Field of Search .............. 431/267, 269, 99; 110/349; 266/48, 225; 102/205

[56] References Cited

U.S. PATENT DOCUMENTS 2,391,823 12/1945 Edmands ............................ 102/205
2,634,196 4/1953 Pennecot .............................. 431/267
3,507,230 4/1970 Seib ....................................... 431/99

Primary Examiner—Carroll B. Dority, Jr.
Attorney, Agent, or Firm—Andrus, Sceales, Starke & Sawall

[57] ABSTRACT

An igniter is provided for slip-on attachment to the free end of a thermal lance. The igniter includes a slip-on cartridge having a frictional support cap. A priming composition (12) and a primer (13) located within the cartridge. The primer (13) is designed as a friction primer and includes a spiral wire friction element within the primer and connected to the cap. Under the pressure of oxygen introduced into the lance, the cap is forced outwardly with the wire friction element activating the primer to create ignition of the priming composition (12), and the operation of the thermal lance.

12 Claims, 1 Drawing Sheet

U.S. Patent
Apr. 10, 1990
4,915,618
FIG.1
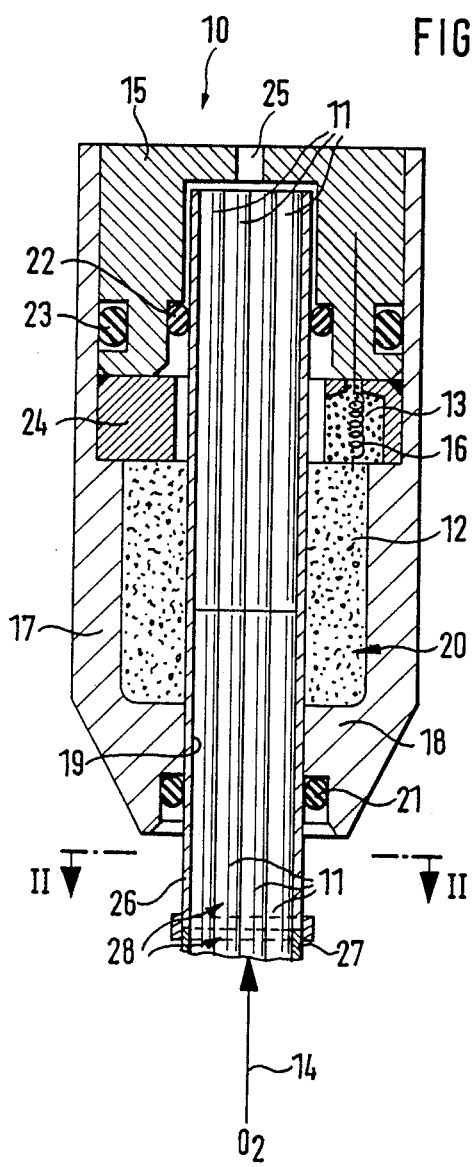
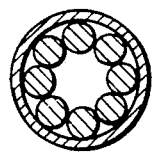
FIG.2

IGNITER FOR THERMAL LANCE

BACKGROUND OF THE PRESENT INVENTION

The present invention relates to an igniter for a thermal lance, comprising a priming composition and a primer which may both be fastened to the free end of the lance.

Such an igniter is known from the German Patent DE-B-31 41 583 for a submarine lance used to cut steel and concrete. Igniters of this type are described, for instance in the U.S. Pat. US-A-35 07 230; however for thermal lances used in operations above water.

The aforementioned igniters each include an electric primer which results in the necessity of the provision of a suitable power supply as well as additional measures to ignite the electric primer. The use of an electric primer, however, is extremely problematic, specifically in operations under water.

Supplementing the aforedescribed prior art, reference should be made to the aspect that the use of an electric arc between the lance and the object under operation is known as well.

This latter technique demands, however, a high-output power supply. The risk of leakage currents is increased, which results in the creation of galvanic elements in underwater operations, entailing the common disadvantages.

Eventually, it is also known to prime thermal lances by hand. These lances are entirely unsuitable in underwater operations. Moreover, priming requires a certain skill on the operator's part.

SUMMARY OF THE PRESENT INVENTION

The present invention is therefore based on the problem of improving an igniter for lance in such a way that an electric source of priming energy need not be provided. Preferably, the igniter should be equally suitable for operations both under and above water. Additional manipulations at the lance end should also be avoided, while it should be kept in mind that lances of the type involved here may have lengths up to 20 m and above.

In accordance with the present invention the problem of the prior art is solved by an igniter designed with an igniter material and a frictional primer so attached to the free lance end that it may be actuated under the pressure of the oxygen supplied into the lance, and ignite the priming composition.

Ignition is achieved exclusively by operation of the oxygen supply system. Accordingly, a thermal lance provided with the igniter, according to the present invention, is very easy to handle. When the igniter is designed as a seated unit on the free end of the lance, the igniter is well suited equally for operations both above and under water. The igniter may be formed as a slip-on and seated cartridge permitting a particularly simple and reliable production of the primer cartridge.

The priming composition is preferably made of an easily ignitable material such as iron thermite, for instance, which undergoes the following reaction:

$$Fe_2O_3 + 3Al2Fe + Al_2O_3 + 2181.5 \text{ kcal } (2960° \text{ C}).$$

In the following, a preferred embodiment of an igniter of the inventive design will be described in more detail with reference to the attached drawing wherein:

BRIEF DESCRIPTION OF THE DRAWINGS

In the Drawings:

FIG. 1 illustrates a longitudinal sectional view through one embodiment of an inventive igniter, and FIG. 2 presents a cross-sectional view through one section of the igniter according to FIG. 1, taken along the line II—II in FIG. 1.

DESCRIPTION OF THE ILLUSTRATED EMBODIMENTS

The igniter 10, shown in the schematic longitudinal section of FIG. 1, is designed to be slipped onto the free end 28 of a thermal lance. The ignitor includes a priming composition 12, e.g. of iron thermite or a similar material, as well as a primer 13 associated therewith. Being a frictional element, the primer can be actuated under the pressure of the oxygen (arrow 14) introduced into the lance or the lance end 28, respectively, with simultaneous ignition of the priming composition 12. In the actual embodiment, the priming composition 12 and the primer 13 constitute parts of a primer cartridge which may be slipped onto the free lance end 28. The cartridge serves at the same time for accommodation of a cap-type lance closure element 15 that may be pushed off under the pressure of the oxygen introduced into the lance while it can be blown off the primer 12 and the priming composition 12 unser the pressure of the ignition so triggered. The primer 13 includes a friction-sensitive primary explosive in which a frictional element, e.g. in the form of a wire spiral 16 or the like, is embedded and which is connected to the lance closure element 15 and which may project upwardly into composition 12. The aforementioned primer cartridge is defined on its outside by a metal or similar cup 17 whose bottom 18 is provided with an opening 19 for the passage of a sleeve 26 which delimits the inner side of the primer cartridge and defines an annular space 20 inside the cup 17, with said annular space 20 being provided to accomodate the priming composition 12, the frictional primer 13 and the lance closure element or the closure cap 15, respectively. The sleeve 26, which defines the inner side of the annular space 20, is used to slip the primer cartridge onto the free lance end 28. This facilitates the attachment lance end 28. This facilitates the attachment and slip-on of the cartridge onto the free lance end 28.

A suitably separated section of the lance tube 27 constitutes the sleeve 26; the fuel rods 11, which are separated along with that separate section and which are disposed along the inside periphery of the lance tube (see FIG. 2), are removed at the sleeve end which is turned away from the lance closure element 15 and projects beyond the primer catridge. The fuel rods 11 are exposed over a suitable length at the free lance end 28 so that the primer cartridge may be slipped onto the exposed fuel rods 11 by means of the sleeve 26 with clamping fixing action at the free lance end 28. According to FIG. 1, the sleeve 26 as well as the fuel rods 11 left in the sleeve 26 are respectively butt-jointed to the face end of the lance tube 27 as well as of the fuel rods 11 projecting therefrom, when the system is assembled. To achieve such an arrangement, the fuel rods which have been previously separated along with the sleeve are pressed out of the sleeve, which in its turn has been separated from the lance end, by a defined length. The part of the fuel rods, which projects from the sleeve, is then severed. Due to the aforementioned press-out action exerted on the fuel rods to push them out of the separated sleeve creates a section in the latter which is free of fuel rods and which may be used later on to slip the sleeve as part of the primer cartridge onto the fuel rods which are exposed at the free lance end. The fuel rods are exposed at the free lance end over a length which corresponds to the length of the sleeve section free of fuel rods or of that portion of the fuel rods which is pressed out of the sleeve.

The primer cartridge is preferably retained additionally by the clamping sleeve provided at the lance end to bridge the the sleeve 26 or that sleeve portion which projects from the primer cartridge, on the one hand, and the free end of the lance tube 27, on the other hand.

The annular space 20 defined, on the one hand, by the cup 17 and the inner sleeve 26, and, on the other hand, by the closure cap 15, is sealed from the outside, specifically in the area of the cup bottom 18 by means of an O-ring 21 as well as by means of a sealing ring 22 which is provided in the area of the closure cap 15 between the latter and the sleeve 26, on the one hand, and by a sealing ring 23, on the other hand, which is disposed between the closure cap 15 and the wall of the cup 17. The sealing rings 22, 23 are also designed as O-rings. With this disposition, the primer cartridge is also suited for underwater operations. Due to the aforementioned seaing rings 21, 22, and 23, water is prevented from penetrating into the annular space 20 which, seen in the direction of the $O_2$-arrow 14, is filled with the priming composition 20 and a spacer ring 24 which accomodates the frictional primer 13 together with the priming composition and the friction element 16. The sealing rings 21, 22, and 23 are also provided for mutual clamping attachment of and to the parts 27, 17 and 15. The thus designed primer cartridge is a self-contained body which may be slipped onto a lance even later on for underwater applications. In order to be able to squeeze or press out the water that may have penetrated into the lance, under the action of supplied oxygen the closure cap 15 is expediently provided with a central opening 25 of a small diameter. Whenever in submarine lance operations water will have penetrated into the lance, this water may be pressed out again through this opening under the action of the supplied oxygen, particularly before the closure cap 15 will be blown or actually fired off with a corresponding activation of the primer 13, and thus of the priming composition 12.

When the priming composition 12 has ignited, it burns and develops a temperature so high that first the comparatively thin-walled sleeve 26 fuses and simultaneously ignites the fuel gas, specifically oxygen, flowing through and out of the lance, as well as the fuel rods or fuel rod sections disposed inside the sleeve 26. Then the cup 17 and progressively the lance will be conventionally consumed.

The foregoing description clearly shows that the ignition is achieved by the introduction of oxygen into the lance, without the necessity of additional operation of an electric primer. The lance may accordingly also be ignited in the immediate vicinity of the object under operation, above and under water, particularly when the igniter is designed with the sleeve 26 as has been described above. Nor is it necessary to make provisions for a water-tight closure of both lance ends. When the lance will be used in submarine operations the water that may have penetrated into the lance prior to slip-on attachment of the primer cartridge, can be pressed out again through the aforedescribed central opening 25. As an electric primer may be omitted, cable connections and electric switches are not required either, so that the entire structure is considerably simplified.

The aforedescribed igniter is thus easy to handle, functionally reliable and simple to assemble. It is suitable for thermal lances of any type whatsoever.

In the event that the igniter is to be used only for operations above water the sleeve 26 may be fundamentally omitted. In such a case, the central opening 25 would not be required in the closure cap 15.

What is essential is the use of the frictional primer 13, with the associated primary explosive being in direct contact with the priming composition which is predominantly composed of iron thermite, for instance, which is easily ignitable. The sleeve 26, however, is expedient also with an igniter provided for operations above water since it defines the annular space 20 on the inner side so that even under rough conditions of operation no priming material will be lost through the bottom opening 19 of the cup 17. In the illustrated embodiment, the closure cap 15 of the cup 17 is designed as a cup stopper but it may also be designed as a cup cap which encloses the cup rim in the form of a cap.

The cap closure 15 is so fitted in the cup 17 that it may be pushed out of the cup under the pressure of the oxygen introduced, overcoming a defined frictional force, with corresponding entrainment of the aforementioned friction element and actuation of the primer 13 which then triggers the ignition of the priming composition 12. The cap 15 is then virtually blown or fired off.

As far as the design of the remaining parts of the thermal 20 lance is concerned, reference is made to the publications given in the introduction to the specification. A more detailed description in this passage may therefore be omitted.

All features disclosed in the present document are claimed as being essential of the present invention to the extent by which they are novel over prior art, either per se or in different combinations.

I claim:

1. An igniter for a coupling to the free end of a thermal lance having a passageway receiving pressurized oxygen, comprising a priming composition (12), a primer adjacent said priming composition a frictional element coupled to said primer, a mounting unit coupling said primer and said priming composition to the free end of said lance, said mounting unit having a closure element (15) coupled to said oxygen passageway and actuated by the pressure of the oxygen introduced by said lance to activate said frictional element to ignite said primer for ignition of said priming composition.

2. The igniter of claim 1 wherein said mounting unit includes a cartridge including said priming composition (12) and said primer (13) and having a mounting end telescoped to the free end of said lance (28), the outer end of said cartridge including said closure element (15) releasably mounted and blown off under the pressure of the oxygen introduced into the said lance and the pressure of said ignition.

3. The igniter of claim 1 wherein said primer (13) includes a friction-sensitive primary explosive, and said friction element (16) embedded in said primer.

4. The igniter of claim 3 wherein said friction element includes a spiral wire connected to said closure element.

5. The igniter of claim 2 wherein said cartridge includes a cup (17) telescoped over the lance and having an outer bottom (18) including an opening (19), a sleeve

(26) passing from said lance into said cup (17) and forming an annular space (20) within said cup (17), said priming composition (12) and said primer (13) located within said annular space, and said closure element (15) secured in an outer end portion of said cup.

6. The igniter of claim 5 wherein said sleeve (26) constitutes a separate part of the said lance tube (27), said lance having a plurality of rods (11) disposed along the internal periphery of said lance tube (27) and projecting from said tube, a plurality of rods secured within the outer end of said sleeve and abutting said rods in said lance tube, said cup having a tubular connecting end slip-on portion on said lance tube.

7. The igniter of claim 6 wherein said sleeve (26) and said fuel rods (11) in said sleeve (26) are butt-jointed to the end of said lance tube (27) and the fuel rods (11) in said lance tube.

8. The igniter of claim 6 wherein a clamping member is connected to said lance tube and said sleeve to secure the cartridge to the end of said lance tube.

9. The igniter of claim 5 including means between the sleeve (26) and cup (17) to seal said primer cartridge to said lance and to seal the inner portion of said sleeve for the environment.

10. The igniter of claim 9 wherein a seal unit (22) is disposed between the said sleeve (26) and said closure element (15), and a seal (23) disposed between said closure element (15) and said cup (17).

11. The ignitor of claim 1 wherein said mounting unit includes a cup-shaped member secured to said lance and said closure element frictional engaging said cup-shaped member and responsive to a predetermined axial force on the closure element to move the frictional element to establish ignition of said primer (13) and said priming composition (12) and thereby a complete blow-off of said lance closure element (15).

12. The igniter of claim 11 wherein said closure element (15) includes a central opening (25) of a smaller diameter than said cup-shaped member whereby water that may penetrate into said lance in underwater operations is pressed out under the action of the oxygen prior to removal of said closure element (15).

* * * * *